May 13, 1958 J. STURROCK 2,834,442
TORQUE CONTROL CLUTCH
Filed Oct. 17, 1956
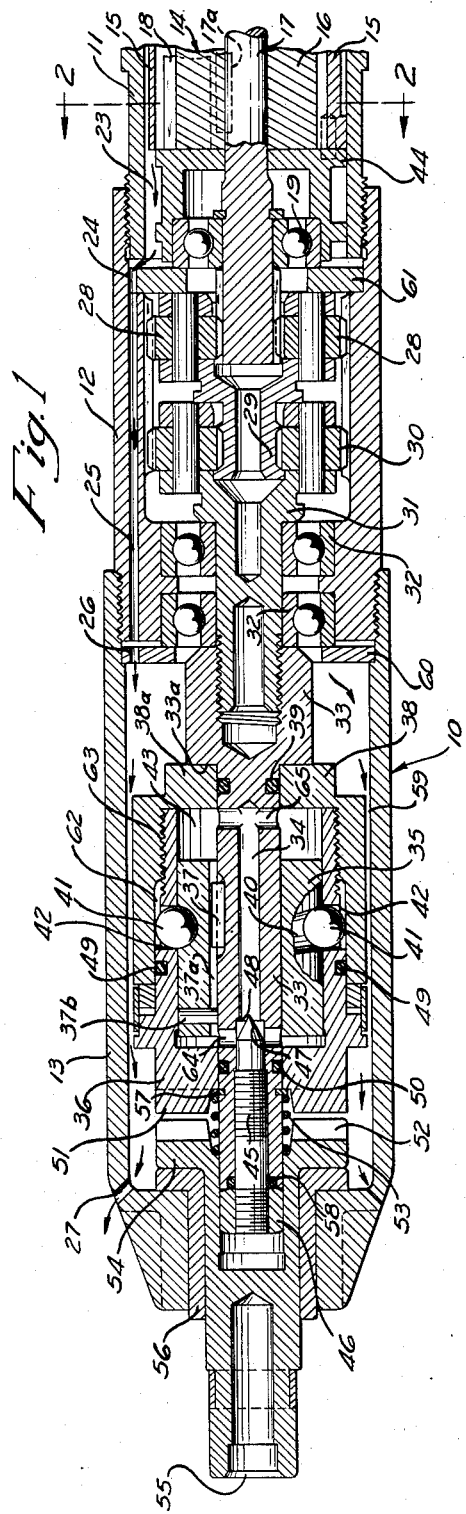
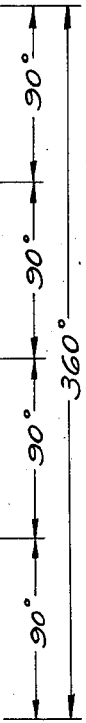
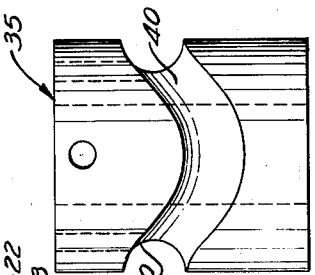
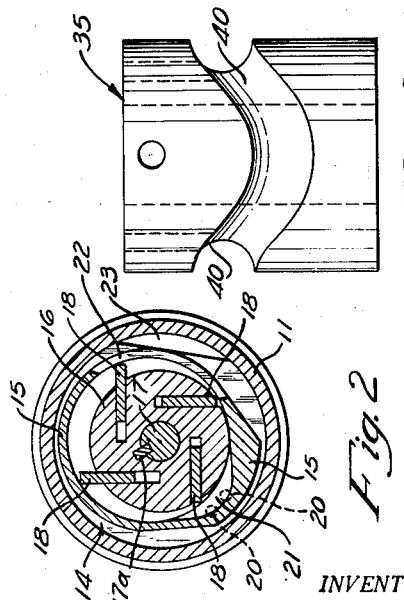
INVENTOR.
JAMES STURROCK
BY
RICHEY, WATTS, EDGERTON & McNENNY
ATTORNEYS United States Patent Office 2,834,442
Patented May 13, 1958

2,834,442

TORQUE CONTROL CLUTCH

James Sturrock, Orwell, Ohio, assignor to Master Pneumatic Tool Company, Inc., Bedford, Ohio, a corporation of Ohio Application October 17, 1956, Serial No. 616,542

12 Claims. (Cl. 192—.096)

This invention relates to power tools, and more particularly, to low torque power tools for running nuts, screws and the like, commonly referred to as power torque wrenches.

It is highly desirable in such power tools to provide readily accessible and accurate means for controlling the maximum torque transmitted from the motor to the work so that the maximum torque may be adjusted readily to suit the requirements of different jobs, and on any setting the tool will always deliver, but never exceed the selected torque value.

An object of this invention is to transmit the torque of a pneumatic motor differentially to a tool for driving the work, and to a hydraulic pump or the like arranged to pump liquid through an adjustable orifice, the torque resistance of the pump varying with the speed, so that the maximum torque that can be applied to the work is equal to the torque required to drive the pump at the speed of the motor. With this arrangement, both the work and the hydraulic pump are driven whenever the torque resistance of the work is sufficient to overcome the friction in the pump and is less than the torque required to drive the pump at the speed of the motor. The torque required to drive the pump at full speed varies with the setting of the adjustable restriction, which can be set to limit the maximum torque applied to the work at any value less than the maximum motor torque. Thus, when the work offers low resistance, it is driven at a speed somewhat less than the motor speed and as the torque resistance of the work increases, the speed at which it is driven decreases, ultimately reaching zero when the limiting torque is reached. At the same time the pump is driven slowly when the resistance of the work is low, and reaches full motor speed when the speed of the work reaches zero. This provides a smooth transition in the application of power to the work, without jolting or impacting the work, and giving very accurate torque control.

Efforts to use hydraulic pumps to limit the torque in power tools have been unsuccessful because of the rapid and excessive heating of the hydraulic fluid. Accordingly, another object of this invention is to prevent such heating of the hydraulic fluid by using a pneumatic motor as the power source and cooling the hydraulic fluid and the pump by the exhaust air from the motor.

These and other objects and advantages will be apparent during the course of the following description taken in conjunction with the drawings wherein:

Fig. 1 is a broken central longitudinal section through an illustrative embodiment of my pneumatic tool invention;

Fig. 2 is a sectional view taken on the line 2—2 of Fig. 1;

Fig. 3 is a side view of the piston showing the ball track therein; while

Fig. 4 is a developed view of the ball track illustrated in Fig. 3.

Fig. 1 illustrates my invention as applied to a power screw driver 10 which includes a motor housing 11, a gear box housing 12 and a drive housing 13. A pneumatic motor 14 includes a stator 15, an eccentrically mounted rotor 16 keyed to a rotor shaft or drive shaft 17 by a key 17a, and blades 18 reciprocable in the rotor 16 providing expansible chambers for causing compressed air to rotate the rotor 16 in the stator 15 in a well known manner. Frictionless bearings 19 are provided for the rotor shaft 17. The pneumatic motor 14 is adapted to be operated by air under pressure at substantially ambient temperature in accordance with means well understood in the art and the same are partially shown in the drawings. For simplicity, the illustrated motor is designed to be driven only in a clockwise direction, as seen in Fig. 2, but it may be a reversible pneumatic motor such as disclosed in U. S. Patent No. 2,715,889 issued August 23, 1955.

High pressure air at substantially ambient temperature, stored in a tank or the like not shown herein, is supplied to the motor 14 through ports 20 in the stator 15 as shown in Fig. 2, and then is conducted into inside milled port 21 disposed between the rotor 16 and the stator 15 and after driving the rotor clockwise and expanding within the pockets defined by the blades 18, the air is discharged through milled exhaust opening 22 in the stator 15 and then is conducted through motor end plate 44 through port 23 in the motor housing 11 from where the air, now expanded adiabatically substantially to atmospheric pressure and consequently very cold, passes successively forward through ports 24 in gear plate 61 and through ports 25 in gear box housing 12 and ports 26 through bearing support 60 in drive housing 13 from where it passes forwardly along and around the hydraulic clutch mechanism hereinafter described through a thin cylindrical chamber 59, and is finally discharged to the atmosphere through discharge ports 27 in the forward end of drive housing 13.

In order to reduce the rotative speed and increase the torque of the motor 14, the illustrated reducing gearing may be used. The forward end of the rotor shaft 17 forms the sun gear of a planetary gearing 28 turning a gear 29 at a reduced speed, which in turn drives planetary gearing 30, which turns a driven shaft 31 operating in bearings 32, which is threadedly connected to a drive shaft 33 disposed in housing 13. The drive shaft 33 is provided with a longitudinal bore 34 extending rearwardly from its forward end to a point rearwardly disposed of the rear end of a piston sleeve 35, surrounding the drive shaft 33 and operatively connected thereto in such manner that it rotates therewith and is capable of limited reciprocation along the shaft 33, by means of a key 37 mounted on the drive shaft 33 and slidably projecting into a keyway 37a in the piston sleeve 35. A pin 37b extends radially through the piston sleeve 35 and seals the forward end of the keyway 37a to reduce leakage between the opposite ends of the piston.

The piston sleeve 35 is axially mounted in a clutch body 36 forming by its inner walls an annular fluid chamber 43. The piston sleeve 35 normally is disposed in spaced relation from the chamber end walls, while a clutch body cap 38 surrounding the clutch body 36 and screwthreadedly secured thereto, is mounted around the drive shaft 33 at its rearward end where it is provided with a thickened bearing portion 38a bearing against a shoulder 33a on the shaft 33, which is provided with a packing ring 39 sealing off the inner periphery of the bearing portion 38a of the clutch body cap. The piston sleeve 35, as illustrated in Figs. 3 and 4, is provided with a multiple cycle sinusoidal ball track 40 having balls 41 disposed therein, while the clutch body 36 is provided with holes 42 loosely fitting around the balls 41 and maintaining them spaced at distances equal to the wavelength of the track 40. As shown, the track 40 consists of two waves and the holes 42 are diametrically opposite to eliminate any tendency to cock the piston 35. Thus the piston 35 is forced to make two complete reciprocations for one turn of the clutch body 36 relative to the shaft 33.

Adjacent the opposite ends of the fluid chamber 43, the shaft 33 is formed with cross bores 64 and 65 intersecting the longitudinal bore 34 and thereby providing a fluid connection between the opposite ends of the chamber 43. The piston sleeve 35 fits snugly on the shaft 33 and within the cylindrical inner wall of the clutch body 36, so that when the chamber 43 at the opposite ends of the piston 35 and the connecting bores 34, 64 and 65 are filled with liquid, the piston 35 can reciprocate within the body 36 only by displacing the liquid through the bores 34, 64 and 65 from one end of the piston to the other, first in one direction and then in the opposite direction.

The forward end of the bore 34 of the drive shaft 33, as shown in Fig. 1, receives a tapered needle valve 45 screwthreadedly engaged therein and provided with a lock nut 46, which permits it to be readily adjusted for moving the tapered valve end 47 towards and away from a valve seat 48, formed in the bore 34 of the drive shaft 33 rearwardly of the intersection of the bore 34 with the cross bore 64. The needle valve 45 provides an adjustable restriction to the flow of fluid through the drive shaft bore 34 connecting the fluid chambers at the opposite ends of the piston sleeve 35, and thereby varies the force required to reciprocate the piston at any particular speed.

The clutch body cap 38 is formed with an enlarged counterbore 62 extending rearwardly from the threaded portion 63 thereof. In assembling the parts, the piston sleeve 35 is inserted into the rearwardly facing open end of the clutch body 36 and the balls 41 are positioned in the holes 42 and extending into the sinusoidal groove 40. This assembly is slipped rearwardly over the nut 46 and the forward end of the shaft 33 with the keyway 37a aligned with the key 37, and into the open end of the cap 38 previously seated on the shaft 33 against the abutment 33a. The keyway 37a is closed by the pin 37b, so that the key 37 and the keyway 37a may have a free sliding fit, facilitating assembly and reducing friction during reciprocation of the piston 35. The threaded portion 63 of the cap 38 is then tightened onto the threaded leading end of the body 36. The balls 41 are held in the groove 40 by the counterbore 62 of the cap 38.

A packing ring 49 is provided in the outer surface of the clutch body and another packing ring 50 is provided around the drive shaft 33, while a packing ring 58 is provided around the inner surface of the drive shaft 33 inwardly of the lock nut 46 to seal the stem of the valve 45. The forward end of clutch body 36 is provided with a clutch jaw 51, normally disposed out of contact with a cooperating jaw 52 by means of clutch spring 53, said clutch jaw 52 being disposed on the rearward end of a work spindle 54 having a socket 55 at its forward end for receiving a wrench, screwdriver or the like, while a bushing 56 is provided between the work spindle 54 and the drive housing 13. A clip ring 57 mounted around the drive shaft 33 inwardly of the clutch spring 53 is provided for fixing the hydraulic clutch assembly against longitudinal movement on the drive shaft 33.

The operation of the power tool disclosed herein requires a suitable connection to a source of compressed air at substantially ambient temperature, which may be supplied by an isothermal compressor, a storage tank or any suitable means.

The chamber 43 at the opposite ends of the piston 35 and the connecting bores 34, 64 and 65 are first filled with oil or other hydraulic fluid, either by submerged assembly or through a suitable plugged filling opening. When the pneumatic motor is started by opening of a suitable throttle valve or the like the shaft 33 and the piston 35 keyed thereto are rotated. Reciprocation of piston 35 is resisted by the restriction provided by the needle valve 45 and valve seat 48 to the flow of hydraulic fluid between the opposite ends of the chamber 43, so that the clutch body 36 rotates with the shaft 33 without reciprocating the piston when the work spindle 54 is not engaged with work to be driven.

When the work spindle 54 is engaged with the work to be driven, the entire tool is pressed forwardly toward the work, forcing the spindle 54 to slide rearwardly and engage the clutch jaw 52 with the clutch jaw 51 on the body 36 and thereby transmit torque to the work. The piston sleeve 35 always reciprocates to some extent under torque resistance offered by the work because the two fluid chambers are connected by an open passage with a restricted orifice so that the rate of reciprocation of the piston sleeve for a given speed of the drive shaft increases in proportion to the torque resistance, and at the same time, the speed of rotation of the work spindle decreases in proportion to the torque resistance, ultimately reaching zero.

A predetermined torque drive limit for operating work up to a desired tension is accomplished by the setting of the needle valve 45, as the piston sleeve continues to rotate the clutch body operating the work until the torque resistance of the work is great enough to reciprocate the piston 35 and thereby drive the hydraulic fluid through the valved restriction at a rate such that the piston makes two complete reciprocations for each turn of the shaft 33, at which time the work is pressed home with the full torque provided by the selected adjustment of the valve, but ceases to rotate. The valve 45 may be adjusted at any time between operations as it does not reciprocate with the piston 35. The drive housing 13 may be readily unscrewed from the housing 12 to expose and permit adjustment of the valve 45.

The high pressures and internal friction developed in the hydraulic fluid cause the clutch mechanism to be heated very rapidly and excessively. It is made practical and useful by cooling the entire clutch mechanism by the adiabatically expanded exhaust air from the pneumatic motor. The path of such air is indicated by arrows in Fig. 1, which includes directing the exhaust motor air out through an exhaust port on the stator through the motor end plate, through ports in a gear plate 61 disposed at the rear of the gearing, then forwardly through a port in the gear box housing, thence forwardly through ports in the bearing support, and thence forwardly into a thin cylindrical chamber surrounding the clutch mechanism where it swirls around the clutch mechanism and provides sufficient cooling to prevent the mechanism from overheating.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A power torque tool comprising a pneumatic motor having a rotatable driving member, a rotatable driven member, a liquid pump having passageways forming a liquid circuit with a restricted orifice therein, differential means coupling said driving member to said pump and to said driven member so that rotation of said driving member tends both to pump liquid through said restricted orifice and to rotate said driven member, a housing enclosing and spaced from said liquid pump and means for conducting the exhaust air from said motor through said housing and around said liquid pump for removing the heat generated by the operation thereof.

2. A power tool for rotating a workpiece comprising, a rotatable shaft, a piston sleeve rotatable with said shaft adapted to reciprocate therealong and disposed in a fluid-tight chamber, a clutch body mounted around said sleeve, a fluid passage through said shaft forming a communication between the opposite ends of said chamber, means for regulating the flow of fluid through said fluid passage, means for providing a hydraulic cam drive connection between said sleeve and said clutch body, and means driven by said clutch body adapted to rotate the workpiece.

3. A power tool for rotating a workpiece comprising, a housing encasing said tool, a rotary fluid motor disposed in said housing, a rotatable shaft driven by said motor, a piston sleeve rotatable with said shaft adapted to be reciprocated therealong, said sleeve being disposed in a fluid-tight chamber, a clutch body mounted around said sleeve, a cylindrical chamber surrounding said clutch body, a fluid passage through said shaft forming a communication between the opposite ends of said chamber, means for regulating the flow of fluid through said fluid passage, means for providing a hydraulic cam drive connection between said sleeve and said clutch body, and means for conducting exhaust air from said motor through a motor exhaust port and directing it forwardly through said housing and through said cylindrical chamber and then out of the forward end of said housing.

4. A power tool for rotating a workpiece comprising, a rotatable shaft, a piston sleeve rotatable with said shaft and adapted to be reciprocated therealong, a clutch body mounted around said sleeve, adapted to rotate a work engaging member and forming a fluid-tight chamber surrounding said sleeve, a fluid passage through said shaft connecting portions of said fluid chamber disposed at opposite ends of said sleeve, means including a cam and cam follower for providing a hydraulic cam drive connection between said sleeve and said clutch body, means for restricting the flow of fluid through said shaft fluid passage for regulating the torque delivered to work through said clutch body, and a work engaging member operatively connected to said clutch body for driving the workpiece.

5. A power tool for rotating a workpiece comprising, a rotatable shaft, a fluid motor for driving said shaft, a piston sleeve rotatable with said shaft, and adapted to be reciprocated therealong, a clutch body mounted around said sleeve, adapted to rotate a work engaging member and forming a fluid-tight chamber surrounding said sleeve, a fluid passage through said shaft connecting portions of said fluid chamber disposed at opposite ends of said sleeve, means including a cam and cam follower for providing a hydraulic cam drive connection between said sleeve and said clutch body, means for regulating the flow of fluid through said fluid passage for regulating the torque delivered to work through said clutch body, a work engaging member operatively connected to said clutch body for driving a workpiece, and means for directing exhaust air from said motor forwardly along and around said clutch body for cooling the clutch mechanism herein described.

6. A power tool for rotating a workpiece comprising, a rotatable shaft, a piston sleeve rotatable with said shaft, and adapted to be reciprocated therealong, a clutch body mounted around said sleeve, adapted to rotate a work engaging member and forming a fluid-tight chamber surrounding said sleeve, and provided with portions disposed beyond the ends of said sleeve, a fluid passage through said shaft connecting said end portions of said fluid chamber, a sinusoidal ball track disposed around the outer periphery of said piston sleeve, a plurality of cooperating ball recesses disposed along the inner periphery of said clutch body, a plurality of cooperating balls disposed in said recesses and adapted to move along said piston sleeve ball track, providing a hydraulic cam drive connection between said sleeve and said clutch body, and means for restricting the flow of fluid through said fluid passage for regulating the torque delivered by said clutch body to the work.

7. A tool for rotating a workpiece comprising, an air motor for rotating said workpiece, an automatic clutch mechanism including; a rotatable driving member, a rotatable driven member, means including a cam and cam follower forming a differential driving connection between said members and producing both relative reciprocation of said members and rotation of said driven member, a liquid resistance pressure means for opposing relative reciprocation of said members with a torque resistance increasing with the speed of such relative reciprocation whereby rotation of said driven member ceases when its torque resistance reaches a predetermined value, and means for conducting exhaust air from said motor along and around said clutch mechanism for cooling the same.

8. A tool for rotating a workpiece comprising, a pneumatic motor, a housing encasing said tool, a rotatable driving member driven by said motor, a rotatable driven member, disposed inwardly of the inner wall of said housing forming an air chamber disposed around said member, means including a cam and cam follower forming a differential driving connection between said members and producing both relative reciprocation of said members and rotation of said driven member up to a predetermined torque resistance, a liquid resistance pressure means for opposing relative reciprocation of said members, and means for conducting exhaust air from said motor through said air chamber.

9. A tool for rotating a workpiece comprising, a housing, an air motor mounted in said housing for rotating said workpiece, automatic clutch mechanism mounted in said housing and disposed inwardly of said casing forming an air chamber surrounding said mechanism, said mechanism controlling the torque delivered to said workpiece and including a rotatable driving member driven by said motor, a rotatable driven member, means forming a differential drive connection between said members and producing both relative reciprocation of said members and rotation of said driven member up to a predetermined torque resistance, liquid resistance pressure means for opposing relative reciprocation of said members, and means for conducting exhaust air from said motor along in said housing through and along said air chamber and out the forward end of said housing for cooling said clutch mechanism.

10. A power tool for a workpiece comprising, a bored clutch body cap mounted in a housing, a bored clutch body mounted in said clutch body cap bore and secured to said cap, a piston sleeve mounted in the bore of said clutch body, extending partially the length of said clutch body bore and provided with a central bore, a rotatable shaft disposed in said piston sleeve bore, said sleeve being mounted on said shaft in such manner that it rotates with said shaft and is reciprocable therealong, the area within said clutch body bore forming a liquid chamber, including portions disposed at the ends of said sleeve, a liquid passage through said shaft forming a communication between the opposite ends of said liquid chamber, and means for providing a hydraulic cam drive connection between said sleeve and said clutch body.

11. A power tool for a workpiece comprising, a bored clutch body cap mounted in a housing, a bored clutch body mounted in said clutch body cap bore and secured to said cap, a piston sleeve mounted in the bore of said clutch body, extending partially the length of said bore and provided with a central bore, a rotatable shaft disposed in said piston sleeve bore, said sleeve being mounted on said shaft in such manner that it rotates with said shaft and is reciprocable therealong, the area within said clutch body bore forming a liquid chamber, an air motor for rotating said shaft, a liquid passage through said shaft forming a communication between the opposite ends of said liquid chamber disposed at opposite ends of said sleeve, means for regulating the flow of liquid through said passage, a cam and follower providing a hydraulic cam drive connection between said sleeve and said clutch body, means driven by said clutch body for rotating said workpiece, and means for conducting exhaust air from said motor around and along said clutch body cap, for cooling the clutch mechanism.

12. A power torque tool comprising, a pneumatic motor, a rotatable piston sleeve, a rotatable clutch body disposed around said sleeve, means including a cam and cam follower forming a differential driving connection between said body and sleeve and producing both relative reciprocation of said parts and rotation of said sleeve up to a predetermined torque resistance, liquid chambers disposed at the ends of said piston sleeve, a driving shaft for rotating said piston sleeve and operatively connected thereto in such manner to permit reciprocation of said sleeve on said shaft, said driving shaft being provided with a longitudinal bore connecting said chambers, said piston sleeve being positioned and arranged within said clutch body in such a manner that it can reciprocate therein by pumping hydraulic liquid through said shaft bore between said chambers, first in one direction and then in the opposite direction, an adjustable restriction regulating the flow of liquid through said shaft bore to said chambers at opposite ends of the piston sleeve thereby varying the force required to reciprocate said piston sleeve at any particular speed.

References Cited in the file of this patent
UNITED STATES PATENTS

| | | |
|---|---|---|
| 2,128,761 | Thomas | Aug. 30, 1938 |
| 2,725,961 | Maurer | Dec. 6, 1955 |
| 2,784,625 | Maurer | Mar. 2, 1957 |